INVENTORS
THOMAS C. MURRAY
RUSSELL R. ROBERTS
BY
ATTORNEYS

INVENTORS
THOMAS C. MURRAY
RUSSELL R. ROBERTS
BY
ATTORNEYS

INVENTORS
THOMAS C. MURRAY
RUSSELL R. ROBERTS
BY
ATTORNEYS

INVENTORS
THOMAS C. MURRAY
RUSSELL R. ROBERTS
BY
ATTORNEYS

ESCAPEMENT MECHANISM

INVENTORS
THOMAS C. MURRAY
RUSSELL R. ROBERTS
BY
ATTORNEYS

June 6, 1967 T. C. MURRAY ET AL 3,323,373

ESCAPEMENT MECHANISM

Filed June 30, 1965 9 Sheets-Sheet 6

INVENTORS
THOMAS C. MURRAY
RUSSELL R. ROBERTS
BY [signature] [signature]
ATTORNEYS INVENTORS
THOMAS C. MURRAY
RUSSELL R. ROBERTS
BY [signatures]
ATTORNEYS

ESCAPEMENT MECHANISM

Filed June 30, 1965 9 Sheets-Sheet 8

INVENTORS
THOMAS C. MURRAY
RUSSELL R. ROBERTS
BY
ATTORNEYS

INVENTORS
THOMAS C. MURRAY
RUSSELL R. ROBERTS
BY
ATTORNEYS

United States Patent Office 3,323,373
Patented June 6, 1967

3,323,373
ESCAPEMENT MECHANISM

Thomas C. Murray, Rochester, and Russell R. Roberts, Ontario, N.Y., assignors to Xerox Corporation, Rochester, N.Y., a corporation of New York Filed June 30, 1965, Ser. No. 468,360
8 Claims. (Cl. 74—1.5)

This invention relates to improvements in automatic indexing devices and particularly to improvements in escapement mechanism to facilitate the controlled movement of a movable element in a machine relative to a fixed plane or reference line.

The principal object of the invention is to improve automatic indexing mechanisms to facilitate the proper orientation of a movable element relative to a fixed reference line or point.

A further object of the invention is to improve indexing mechanisms to provide one or two directional controlled movement that is positive and accurate.

These and other objects of the invention are attained by means of an improved escapement mechanism that is illustrated and described for use in indexing a microfiche holder, transversely and longitudinally, across a reference line in the form of a scanning system whereby each microimage is transported past the optical axis of a projection system. For purposes of illustration in the utilization of the invention, the movement of each microimage across the optical axis is in timed relation to the movement of a sensitized xerographic plate whereby the light image of each of the microimages is effective to form an electrostatic latent image on the xerographic plate in an enlarged configuration of the light image. While parts of an automatic xerographic reproduction machine are illustrated and described herein, it is only for illustration purposes, as the machine provides a typical environment for the use to which the invention may be made. The complete automatic xerographic reproduction machine to which the present invention is particularly suited is shown and described in detail in the copending application, Ser. No. 468,325, filed June 30, 1965, in the name of Murray et al.

A preferred form of the invention is shown in the accompanying drawings in which.

Figure 1:
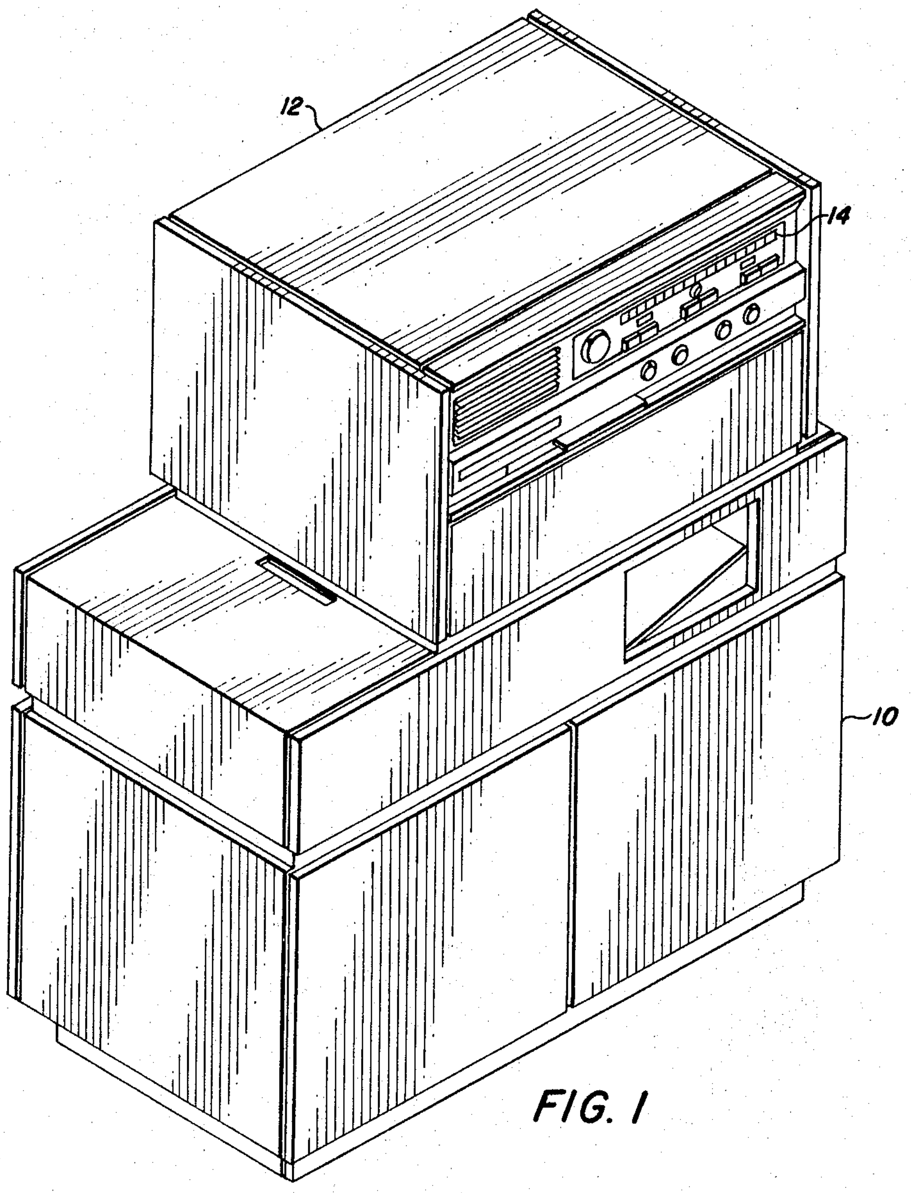
FIG. 1 is a perspective view of an automatic xerographic processing machine which incorporates the invention.

In the particular arrangement shown in the drawings, the invention is incorporated in a microimage xerographic reproduction system that is a fully automatic, continuous printer for reproducing information contained on microfiche sheets. This equipment reproductions copy on individual sheets of paper, that may have a width up to 9 inches and a length of 14 inches in a magnification ratio of approximately 16× which is enlarged to the full width of the sheet of material. Referring to FIG. 1, the system may be considered to include three distinct sections for housing the several elements thereof; namely, the base section 10 for housing a xerographic drum; the paper supply tray and feeding apparatus, as well as the devices for effecting the xerographic functions of plate charging, xerographic developing, image transfer, brush cleaning, etc.; an upper section 12 for housing the microfiche handling apparatus, as well as the bulk of the optical system; and a control section 14, mounted on the base section and forward of the upper section, for housing certain of the electrical equipment required in the system and to provide a control panel whereon the operator may set selected one of a plurality of switches for selecting the desired type of operation.

In the system disclosed herein, a microfiche sheet holder containing a microfiche 40 is placed in the indexing mechanism 16 from which it is sequentially moved first in one direction and then in another direction. Suitable driving means are provided for effecting the two-directional movement of the microfiche whereby it is caused to move past the optical axis of a light projecting system to be described hereinafter for the purpose of scanning the microimages with a scanning light line. The light image of each microimage arranged on the microfiche is projected downwardly through an adjustable objective lens assembly and through a slit aperture assembly 18 and onto the surface of a xerographic plate in the form of a drum 20.

Figure 2:
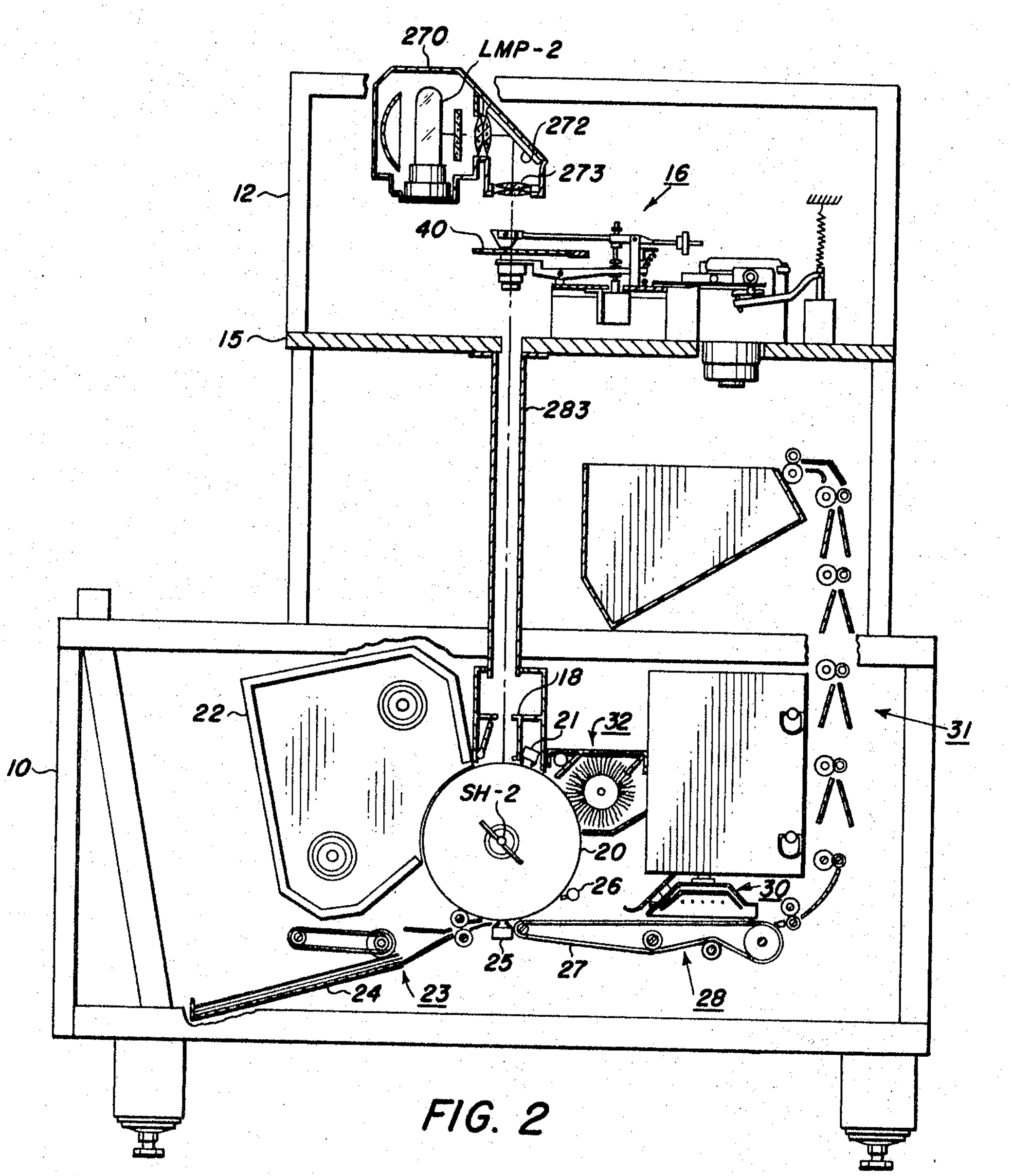
FIG. 2 is a schematic sectional view of the machine embodying the invention.
Figure 4:
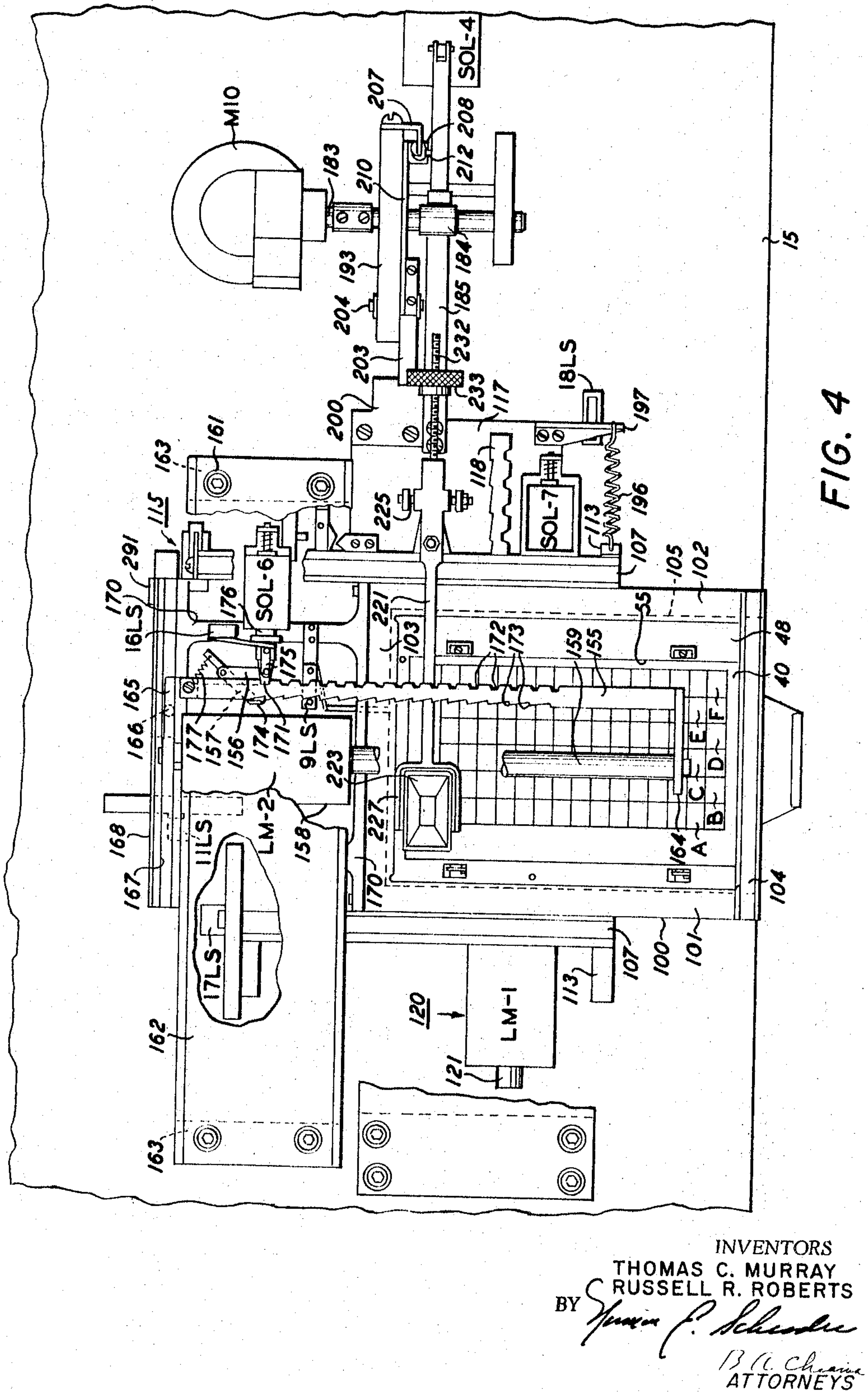
FIGS. 4, 5 and 6 are plan, front and side views, respectively, of the microfiche handling mechanism.
Figure 5:
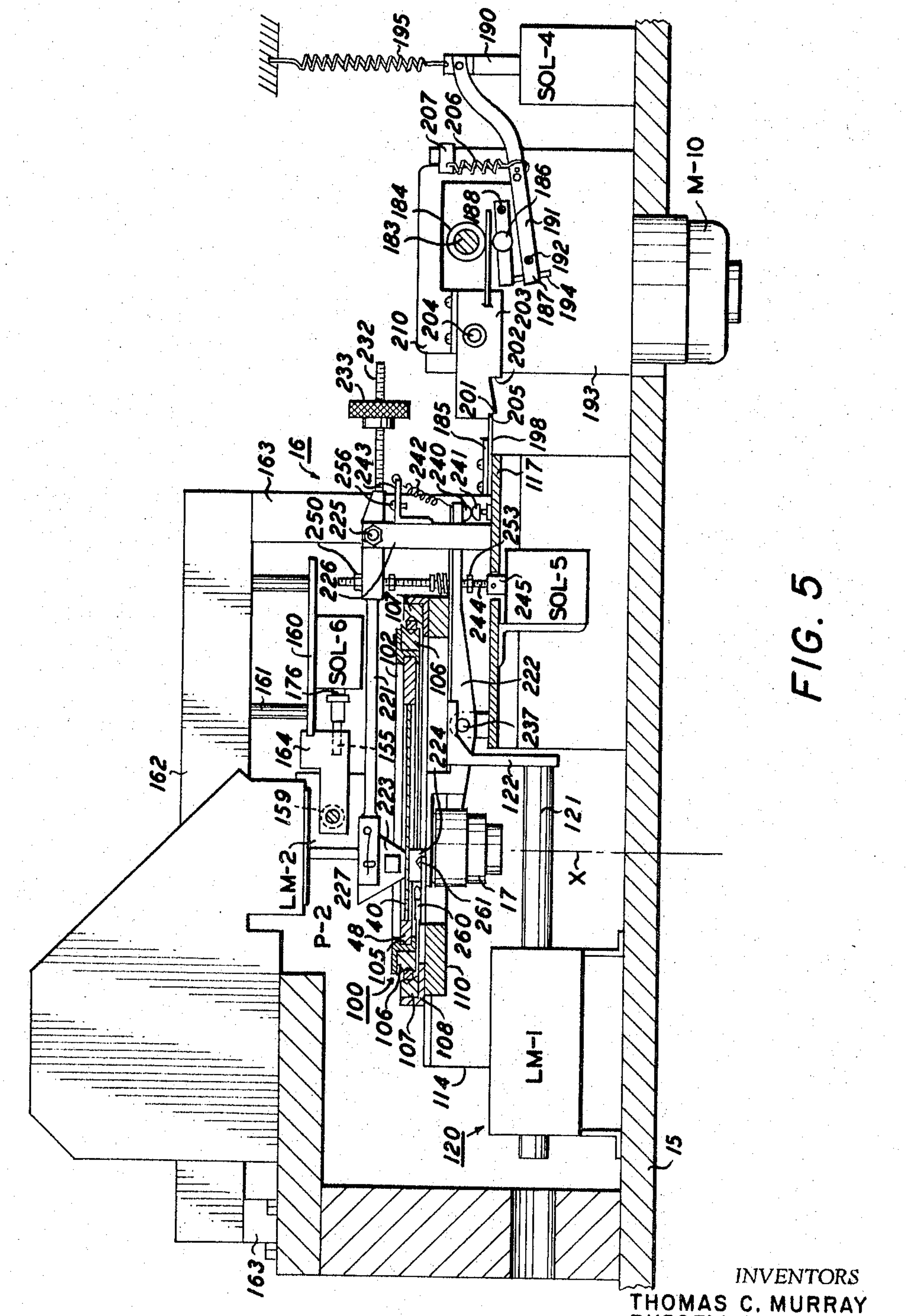

In order to scan a microfiche effectively in the apparatus illustrated in FIG. 2, there is provided a microfiche holder generally indicated by the numeral 48. As shown in FIGS. 4 and 5, the holder includes a holder base, of generally rectangular frame structure.

For positioning the holder 48 into the microfiche handling mechanism 12, the fiche holder is held by hand so that the plane of the microfiche within the holder is horizontal; and the rear end or the end is inserted into a suitable slot formed in the cabinet for the machine.

The xerographic machine illustrated in FIG. 2 is provided with a microfiche carriage assembly which receives a microfiche holder and carries it through two indexed movements, one in a longitudinal direction and the other in a transverse direction, and through reciprocable scanning movement; that is, the "scan" or exposure stroke and the return stroke during continuous operation of the machine. As previously stated, the microfiche is inverted when mounted in the holder 48; and this is the orientation that the fiche will maintain during scanning of each of the individual microimages thereon. In order to facilitate description for the microfiche handling mechanism, a typical fiche is illustrated in FIG. 4 as being mounted inverted in the holder 48.

Throughout the description of the microfiche handling mechanism 12, the movement of the holder 48 from bottom to top, as viewed in FIG. 4, will be considered movement in the longitudinal direction; and the movement from right to left will be designated movement in the transverse direction. This nomenclature is consistent with the layout of the several microimages on the microfiche wherein the rows extend in the longitudinal direction and the columns extend in the transverse direction. It will also be noted that the first microimage on the microfiche is in the upper left-hand corner of the opening 55 in the holder 48. This is the starting point for producing reproductions of the microimages on a microfiche by use of the present machine.

The carriage indicated generally by the reference numeral 100 for supporting the microfiche holder during indexing and scanning of the microfiche is of generally rectangular frame structure comprising side members 101 and 102, end member 103 and a brace 104 across the front end of the carriage. The members 101, 102 and 103 are connected and arranged coplanar in U-shape with the brace 104 being secured at its end to the open side of the frame and on the top surface thereof. In order to slidably retain the microfiche holder 48, each of the frame members 101, 102 and 103 is formed with a groove 105 (see FIG. 5) along the inner edge of each of the members. The transverse distance between the bottom of the grooves formed in the members 101 and 102 is equal to the or slightly larger than the transverse distance between the outer edges of the stiles 51 and 52. The shape of each of the grooves are such that the microfiche holder may be slid along the sides of grooves until the outer edge of the end brace 54 engages the bottom of the groove formed in the end member 103. A plurality of spring biased ball bearings (not shown) may be provided in each of the grooves for lending friction to the engagement of the microfiche holder with the carriage members.

Figure 6:
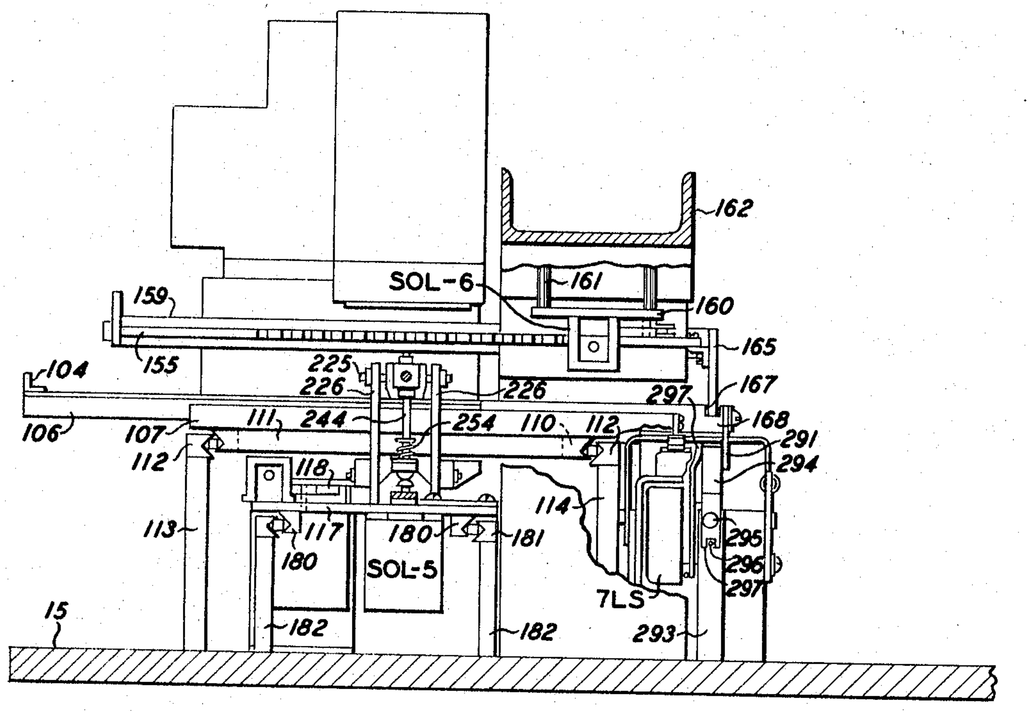

Mounted below each of the side members 101 and 102 along an outwardly extending flange thereof is the inner race 106 of a ball bearing slide suspension mechanism. The tapered grooves for the races faces outwardly and cooperates with the outer race 107 of the slide mechanism. Suitable ball bearings are arranged between the respective grooves for supporting the inner races, the carriage 100 and the microfiche holder 48 and also for permitting sliding action of this structure relative to the outer races 107. The outer races 107 are secured along the outer edges of a supporting plate 108 having a generally rectangular shape of larger size than the carriage 100. The support plate 108, in turn, is mounted to and immediately above a rectangular frame structure which comprises transverse extending elements 110 and longitudinal elements 111 (see FIGS. 5 and 6). The outer edges of the parallel elements 110 are formed as the inner races of a ball bearing slide suspension system which includes outer races 112 mounted upon vertically extending parallel support plates 113 and 114, which, in turn, are secured to the base plate 15. Suitable ball bearings are arranged along the opposing grooves of the races and thereby support the plate 108.

From the foregoing it will be apparent that the microfiche holder and its supporting carriage 100 is supported and adapted for movement in either direction on a longitudinal path by a slide mechanism comprising the bearing races 106 and 107, and is also adapted for movement in either direction on a transverse path by the slide mechanism comprising the races 110 and 112. In moving in a transverse path, the slide mechanism 110 and 112 carries the microfiche holder as well as the slide mechanism 106, 107 which supports the carriage for movement in a longitudinal path.

Figure 3:
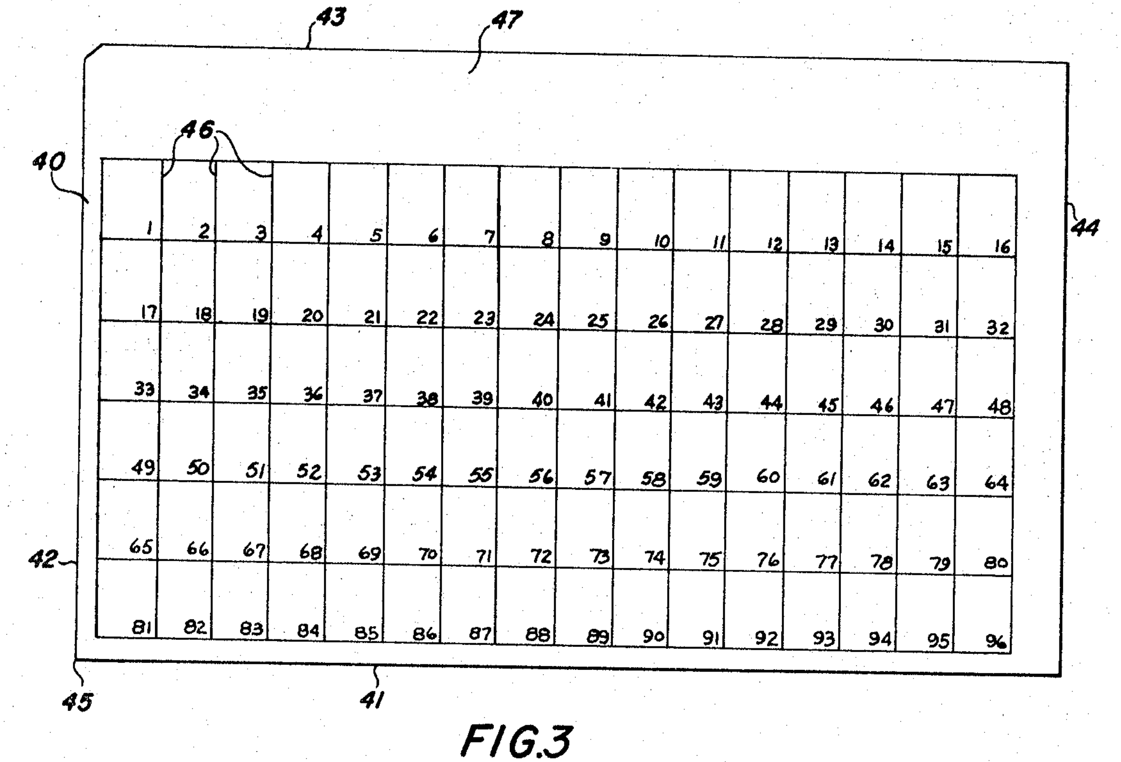
FIG. 3 is a schematic illustration of a typical microfiche card showing the arrangement of microimages thereon.

As previously stated, when placed in the microfiche holder, the microimages of a microfiche are arranged such that the images extend longitudinally in rows and transversely in columns. In the layout of a microfiche of the type shown in FIG. 3, the images numbered 1–16 are arranged longitudinally or from left to right along the lower edge of the microfiche, as viewed in FIG. 4. These microimages are arranged in side-by-side fashion which results during the photographic reproduction of a microfiche from original documents. In the second row, the images are numbered 17–32 and are also arranged in side-by-side fashion. By arranging the microimages in rows as the microfiche is produced, there also results a columnar arrangement of images wherein the images are in end-to-end pattern. For example, the microimages number 1, 17, 33, 49, 65 and 81 are in end-to-end relationship and therefore comprise the first column in the michofiche.

To facilitate the description of the indexing motion imparted to the microfiche in the following description, the rows in the microfiche are designated with capital letters, and the columns are designated by numerals. For the particular microfiche illustrated, there are six rows, and these are labeled A–F and; there are sixteen columns, and these are labeled 1–16. In the event that a seventh row is added when a particular microfiche is manufactured, this new row would occupy the space 47 of the microfiche (see FIG. 3).

When a microfiche holder is inserted into the carriage 100, as the first step prior to operation of the machine, the microimage designated 1 is in a position to be scanned by a scanning mechanism described hereinafter. After the first microimage is scanned, the carriage 100 is indexed or moved a predetermined distance in a longitudinal path the width of a microimage to the left, as viewed in FIG. 4, in order to position the number 2 image into proper scanning position. After the number 2 image has been scanned, the cariage 100 is again indexed to the left in order to present the number 3 microimage into the scanning position. This procedure continues until the sixteenth microimage has been scanned to thereby complete the indexing and scanning of all of the microimages in row A. When this is accomplished, the microfiche carriage 100 is returned to its initial starting position in the longitudinal path and to the position wherein the microimage number 17 is in position to be scanned as the first microimage of row B. In moving to this position, the microfiche carriage 100 was indexed in the transverse path which is accomplished by moving the carriage to the left, as viewed in FIG. 4.

In making reproductions of the microimages on a microfiche, the microfiche is indexed in two directions, one direction for moving images of a row into scanning positions and the other direction for moving the fiche from one row to another. To this end, there is provided an indexing mechanism generally indicated by the reference numeral 115 (see FIG. 4) for imparting longitudinal movement, and a similar indexing mechanism generally indicated by the reference numeral 16 (see FIG. 7) for imparting transverse movement of the microfiche.

Figure 12:
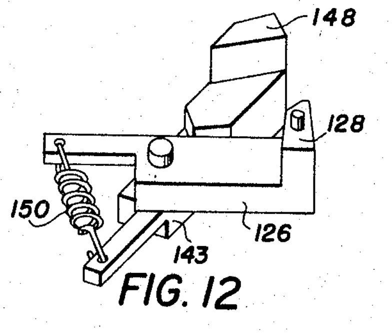

The transverse indexing mechanism 116 is illustrated in FIG. 12 as comprising a transverse escapement solenoid SOL–7 secured upon a scanning platform 117, an indexing rod 118, an escapement mechanism 119 and an indexing drive mechanism in the form of a linear induction motor or actuator 120 having a stator LM–1 and a drive rod 121. Any suitable type of linear motor may be utilized, but it is preferred that the motor be of the type wherein the stator comprises a series of coils through which a soft iron core or rod is movable in either direction, that is, in an indexing direction and in the reverse direction. The stator for the linear motor is adapted for energization with alternating current for producing a magnetic field along the length and, which with certain switching connections, may force the drive rod 121 in either direction depending upon the connections. When the series of coils are de-energized, the drive rod may be physically moved in either direction and, when energized, will move the rod with a constant velocity and force directly proportional to the electrical input thereto and in a direction determined by the switching arrangement utilized for imparting the rotation.

As shown in FIG. 5, the stator LM–1 for the linear actuator is secured to the base plate 15, and the drive rod 121 is relatively long, extending through and beyond both ends of the stator casing. One end of the drive rod 121 has an L-shaped bracket 122 secured thereto which in turn is secured to the under portion of the support plate 108, by any suitable means such as screws 123 (see FIG. 8). The screws 123 also serve to secure one end of the indexing rod 118 to the bracket 122 and consequently to the drive shaft 121. The escapement mechanism 119 has a dual function, one of which produces indexing of the plate 108 to effect indexing of the microimage rows of a microfiche when the induction motor 120 is energized, and the other to allow scanning movement of the scanning platform 117 by a scanning mechanism which causes the movement of plate 108 during a scanning operation.

The indexing rod 118 is unsupported at one end, is relatively long and generally flat in configuration, and has formed on one edge a plurality of tapered notches, in this case, seven notches, being spaced from each other a distance equal to the length of a microimage on the microfiche or the distance between a point on a microimage in one row and the corresponding point on the microimage located in the same column but spaced in the next row thereto. Since there are six rows of images on the microfiche illustrated, only six notches 124 are necessary. However, in the event that a seventh row is added in order to use up the space provided in the area 47 of the microfiche, the seventh notch on the indexing rod 118 may be utilized. The other longitudinal edge of the rod 118 is formed with a series of teeth 125, each of which is spaced from the other the same distance that the notches 124 are spaced from each other.

Figure 8:
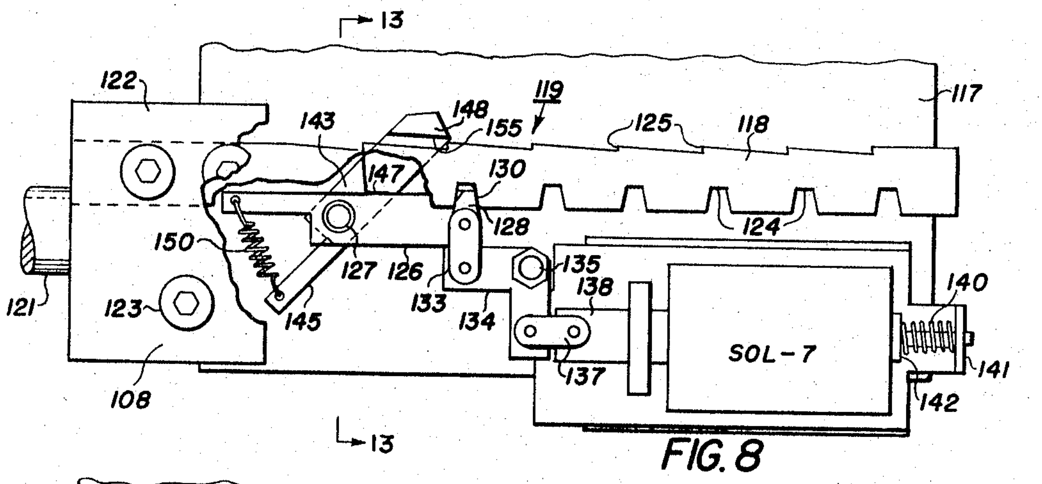
FIG. 8 is a plan view of one of the indexing devices utilized in the handling mechanism.
Figures 9, 13:
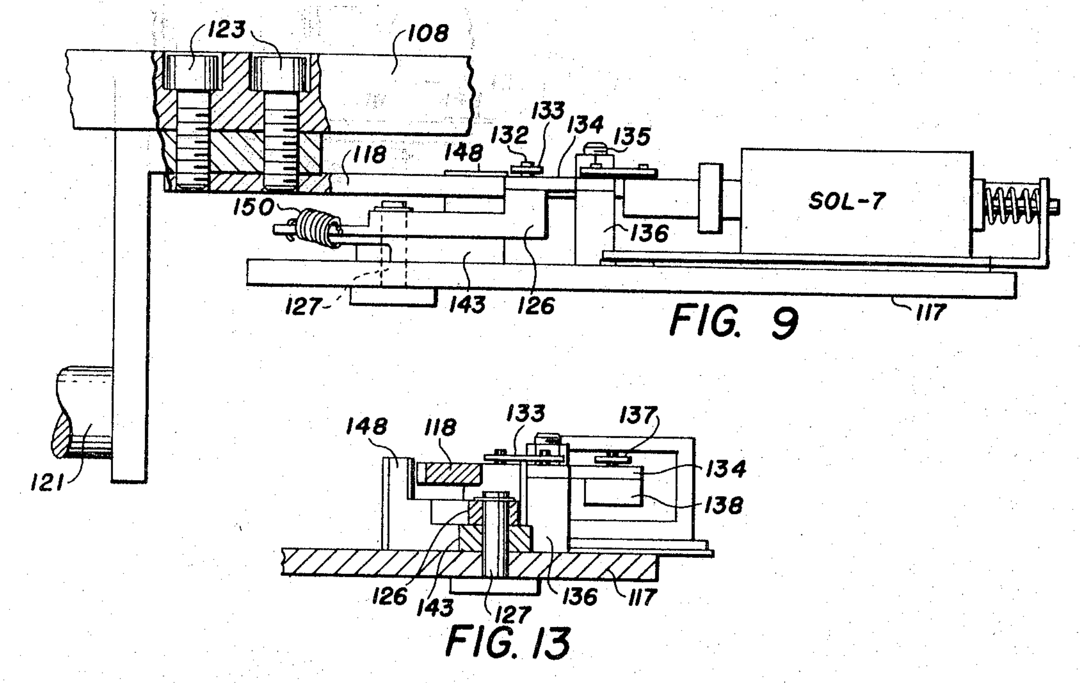
FIG. 9 is a side view of the indexing device of FIG. 8.
FIG. 13 is an end sectional view of the indexing device taken along the line 13—13 in FIG. 8.

The notches 124 are adapted to cooperate with a latching device in the form of a lever 126 (see FIGS. 8–16) pivotally mounted by a pivot pin 127 extending through a suitable opening in the lever and secured to the scanning platform 117. The lever 126 is provided with a projecting latch element 128 which is adapted to slide into each of the notches 124 when the lever 126 is rotated to a particular position. As shown in FIGS. 8 and 9, the latch element 128 is formed with a bearing surface 130 which aligns itself parallel to one of the sides of the notch 124 when the element 128 is completely inserted in the notch. The element 128 is also formed with an angled bearing surface 131 which, as will be described hereinafter, serves as a cam for directing the latch element into a notch.

Immediately above the element 128, the lever 126 is provided with a pivot pin 132 (see FIG. 11) which pivotally cooperates with a link 133 which in turn is pivotally connected to one leg of a bell crank 134, as shown in FIG. 8. The apex of the bell crank is pivotally connected by a pivot pin 135 formed at the upper end of a vertical post 136 and mounted on the scanning platform 117. The pin 135 may have threads formed at one end for receiving a nut for detachably retaining the bell crank 134. The other leg of the bell crank 134 is connected by a pivotal link 137 to one end of a plunger 138 associated with the solenoid SOL–7.

When energized, the solenoid SOL–7 retracts the plunger 138 or actuates it to the right, as viewed in FIG. 8. The action rotates the crank 134 in a counterclockwise direction causing the withdrawal of the latch element 128 from a notch 124. In order to cushion the shock produced by the movement of the plunger 138, there is provided a coil spring 140 which encircles the end of an extension of the plunger projecting out of the end of the solenoid remote from the bell crank 134. This spring is anchored between an upturned flange 141 secured to the platform 117, and a washer 142 integrally secured to the plunger 138.

Figure 10:
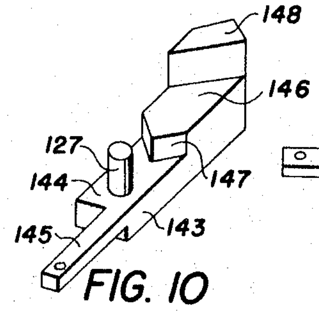
FIGS. 10, 11 and 12 are isometric views of a detail in the indexing device.
Figure 11:
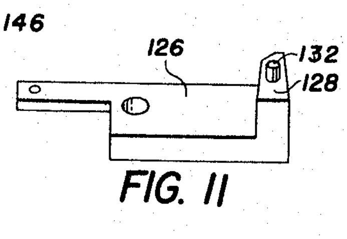

A second latching lever 143 is also pivotally mounted on the pivot pin 127 immediately below the lever 127 and, as shown in FIG. 10, is formed with step portions along its longitudinal axis. The lowermost step 144 is provided with an opening through which the pivot pin 127 extends and includes an extension 145 projecting radially from the pivot 127. The lever 143 is adapted for limited pivotal movement about the pivot pin 127, rotating upon the top surface of the platform 117 during this action. The limited pivotal movement of the lever 126 is performed utilizing the upper surface of the portion 144 as a bearing surface. The intermediate step 146 on the lever 143 has a thickness equal to the thickness of the lever 126 which when mounted upon the pin 127 rides upon and rotates relative to the portion 144.

The step 146 is formed with a bearing surface 147 which is adapted to contact one edge of the lever 126 when the same is in the position shown in FIG. 8, wherein the latch element 128 is in one of the notches 124. The bearing surface 147 limits the extent of the pivotal movement in one direction of rotation of one latching lever to the other; for example, as shown in FIG. 8, with the bearing surface 147 in contact with the lever 126, the lever 143 is held against clockwise rotation. The third and uppermost step 148 formed on the lever 143 serves as a latching element for that lever similar to the latch element 128 and is adapted to cooperate with each tooth 125 on the index rod 118. With both latching levers 126, 143 located below the rod 118, the latch elements 128, 148 are in the plane of the index rod.

A coil spring 150 is connected at its ends to one end of the lever 126 and the outer extremity of the extension 145, both connections being on the same side of the pivot pin 127. This spring normally biases the levers in their respective positions shown in FIG. 8 wherein the bearing surface 147 is in engagement with the adjacent edge of the lever 126. When the solenoid SOL–7 is de-energized, the spring 150 forces the plunger 138 to the left, as viewed in FIG. 8, and rotates the crank 134 counterclockwise to force the latch element 128 into a locking engagement with one of the notches 124.

During a complete indexing cycle performed by the above-described structure, that is, in imparting movement to the plate 108 for indexing the microfiche one row, the latching elements 128 and 148 alternate in their cooperative engagement with their respective cooperating edges on the indexing rod 118. In performing an indexing operation, when the latching element 128 is in a notch 124, the latching element 148 is out of engagement with its cooperating step 125. Conversely, in the event that the latching element 148 is in engagement with a tooth 125, the latching element 128 is out of the notch 124.

Figures 14, 16:
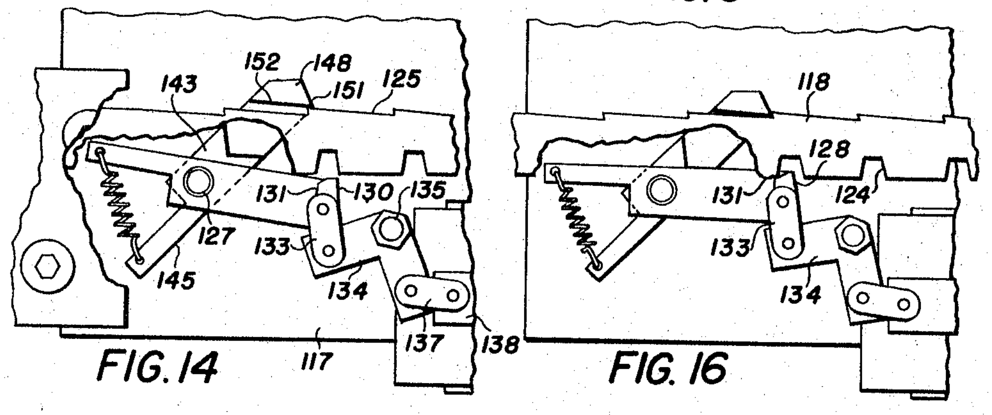
FIGS. 14, 15 and 16 are plan views, partly broken away, showing the indexing mechanism in various positions of operation.

In describing the operation of the indexing mechanism illustrated in FIGS. 8 to 16, it will be assumed that the microfiche is positioned as shown in FIG. 4; that is, row A of the microimages is in position for scanning. With this positioning of the microfiche and its associated carriage 100, the indexing bar 118 will be in the position illustrated in FIG. 8; that is, the first notch 124 will be in cooperative relationship with the latching element 128, and the element 148 is clear of any tooth 125. It will also be assumed that the last microimage in the row, namely, the microimage numbered 16, has been scanned; and the apparatus is in condition for being indexed in order to place the first microimage of row B in the scanning position. In order to commence indexing, the solenoid SOL–7 is energized by a circuit in order to withdraw the latch element 128 from the first notch 124. The positioning of the parts after this withdrawal of the element 128 is illustrated in FIG. 14 wherein the bell crank 134 has pivoted in a counter-clockwise direction for rotating the lever 126 to the position shown. During this action, the lever 143 starts to rotate in a clockwise direction by reason of the force produced by the coil spring 150. When the lever 126 rotates in a clockwise direction, this rotation of the lever 143 tends to draw the element 148 downwardly. In moving the latching element 148 from the position shown in FIG. 8 to its position shown in FIG. 14, the extreme tip 151 of the latching element 148 engages the extreme upper tip of the tooth 125 which prevents further rotation of the lever 143 and downward movement of the latching element 148. The lever 126 continues its clockwise rotation until the parts assume the position as shown in FIG. 14. The indexing bar 118 is now in condition for being moved in either direction.

Figure 7:
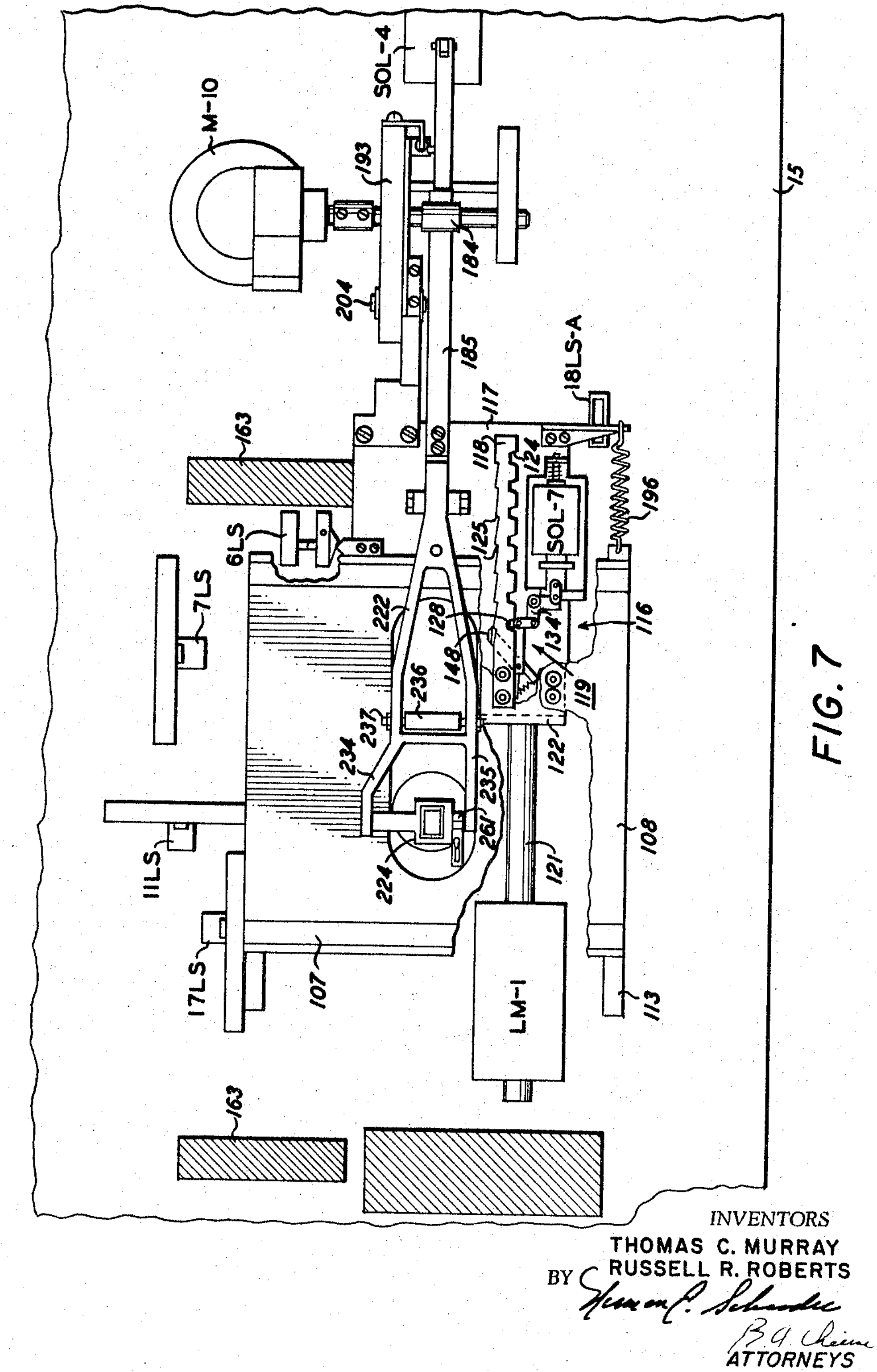
FIG. 7 is a plan view, partly broken away, of the portion of the handling mechanism positioned below the plane of the microfiche when in scanning position.
Figure 15:
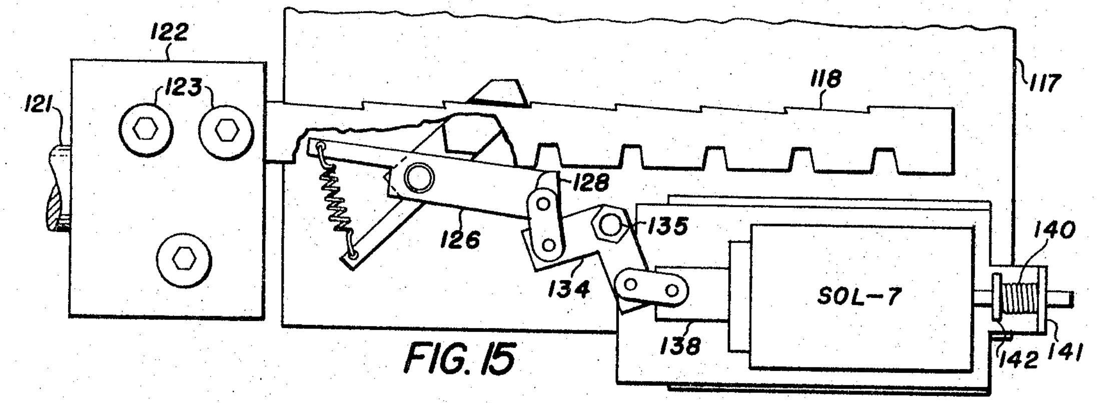

When the linear actuator 120 is energized, it moves the drive shaft 121 to the left as viewed in FIGS. 7 and 8, drawing with it the indexing rod 118 until the extreme tip 151 and the bearing surface 152 for the latching element 148 slides down the tooth 125 or to the position shown in FIG. 15. As the drive rod 121 is moving to the left, it imparts a transverse movement to the plate 108 and consequently the microfiche carriage 100. As previously stated, the distance or length of one of the teeth 125 is the distance that a particular microfiche must move in order to move each row of microimages past a predetermined fixed point. When the latching element 148 is positioned such that the extreme end 151 is in engagement with the lower point of a tooth 125, further movement of the microfiche carriage is prevented. The stator LM–1 of the linear actuator 120 will be energized at the same time that the latch element 148 is firmly in place against a tooth 125.

During indexing movement of the index rod 118, the parts of the transverse indexing mechanism 116 is shown in FIG. 15. After indexing has been completed, the solenoid SOL–7 is deenergized to permit the spring 140 to return the bell crank 134 into its original position, illustrated in FIG. 8. During this action, as shown in FIG. 16, the bearing surface 131 will engage a corner of a notch 124 and guide the latch element 128 into proper alignment relative to the notch so that further action by the spring 150 will insure that the latch element will firmly fit within the notch. As the latch element 128 assumes its final position in a notch, the edge of the lever 126 will engage the bearing surface 147 on the lever 143 and will rotate this lever in a counterclockwise direction in order to move the latching element 148 completely out of engagement with any of the teeth 125.

In a typical indexing cycle of operation, the first stage of movement of the index rod 118, that is, when under control of the latching element 148, is movement of the microfiche in relatively course or close approximation. In other words, with the parts positioned as shown in FIG. 15, the stator LM–1 de-energized and the index rod 118 apparently fixed, it is not until the latching element 128 has been moved and secured into a notch 124, as viewed in FIG. 8, that the indexing rod 118 is in an accurate and precise location. In moving from the position shown in FIG. 15 to the position shown in FIG. 8, the latching element 128 may produce a slight movement of the index rod 118 in order to locate this rod in a predetermined, precise position. The bearing surface 131 is provided for insuring that the latch element 128 will not engage the index rod 118 in such a way as to damage or impair progress of the latching element in its move to final positioning within notch 124. In the event that the index rod 118 is misaligned a considerable distance during the first stage of indexing by the latching element 148, the bearing surface will always engage one corner of the notch 124 for properly locating the latching element 128 relative to a notch 124 which action will require movement of the index rod 118 to its final desired position.

The longitudinal indexing mechanism 115 is similar to the transverse indexing mechanism 116, differing in the provision of a bell crank such as the bell crank 134 and the links pivotally mounted on the legs of a bell crank. As shown in FIG. 4, the indexing mechanism 115 comprises an indexing rod 155, a longitudinal escapement solenoid SOL–6, an escapement mechanism including latching levers 156, 157, a linear induction motor 159 having a stator LM–2, and a drive rod 159 for the induction motor. The solenoid SOL–6 is secured to a plate 160 suspended by suitable spacer posts 161 from a raised horizontally positioned beam 162 secured at its ends to the base plate 15 by vertically arranged supports 163. The beam 162 is secured above the support plate 108 and the microfiche carriage in order to permit these members to move thereunder during indexing of the microfiche carriage in its two directions of movement.

The stator LM–2 for the induction motor 158 is also secured to and below the beam 162 for maintaining the stator in a fixed position. As shown in FIG. 4, the indexing rod 155 and the drive rod 159 extend longitudinally relative to the microfiche and its carriage and are spaced in parallel in a plane above the carriage. A suitable bracket 164 connects the free ends of the indexing rod and the drive rod in order to support one end of the rod 155 and to maintain the spacing a parallelism between these rods.

The other end of the indexing rod 155 is connected to the upper edge of a vertically extending movable plate 165 for support thereby. This plate is arranged on a lower edge thereof to which is a roller 166 secured for rotation in a horizontal plane. The roller 166 is adapted to ride on either side of a groove 167 formed along the upper edge of a plate 168 that is made movable with the microfiche carriage. The longitudinal axis of the groove 167 is arranged in a plane parallel to the plane of the microfiche carriage 100 and is spaced from the carriage by connecting members 170 secured between the end member 103 of the carriage and the plate 168. With this arrangement, the groove 167 is horizontally oriented and extends in a transverse direction relative to the microfiche 40 and is movable with the carriage 100 in both of its indexing movements.

During indexing movement of the microfiche carriage in its longitudinal path, when the index rod 155 will be moved upwardly, as viewed in FIG. 4, carrying with it the movable plate 165, the plate 168 and the groove 167 will also be driven in this direction. During indexing of the microfiche carriage in the transverse direction, the track 167 will be moved along its longitudinal axis and, by virtue of the roller 166, will slide relative to the movable plate 165 which will be held fixed against movement in this direction by means of its connection to the index rod 155.

In the longitudinal indexing mechanism 115, the latching lever 156 is the same as the latching lever 126 and includes a latching element 171 adapted to cooperate with notches 172 formed in one edge of the indexing rod 155. On the other edge of the rod 155, teeth 173 are formed and adapted for cooperation with a latching element 174 provided on the lever 157. A link 175 is pivotally connected between the lever 156 and the plunger 176 for the solenoid SOL–6 for imparting rotation of the levers 156 and 157. A coil spring 177 is held in compression between the outer ends of these levers to perform the same function as the spring 150 for the escapement mechanism 119 and normally urges the latching element 171 into one of the notches 172.

The operation of the indexing mechanism for longitudinal movement of the microfiche carriage is identical to the operation of the transverse indexing mechanism. In this operation, when the SOL–6 is energized to retract the plunger 176, the lever 156 is rotated in a counterclockwise direction which tends to impart counterclockwise rotation of the lever 157 to cause the latch element 174 to engage and be held against further rotation by the extreme tip of one of the teeth 173. In accordance with the electrical program sequence, the stator LM–2 will be energized to actuate the drive rod 159 upwardly, as viewed in FIG. 4, resulting in sliding movement of the latching element 174, upon a tooth 173 until the same engages the next succeeding tooth.

This movement of the drive rod and the indexing rod 155 imparts movement to the movable plate 165 and, in the longitudinal direction for the microfiche carriage, consequently the plate 168, by virtue of the roller 166 connecting these elements. Movement of the plate 168 will produce movement of the microfiche carriage in a longitudinal path. The spacing between the notches 172 is equal to the width of a microimage on the microfiche, and each indexing movement of the index rod 155 will shift the microfiche from column to column. For the particular microfiche described, there are sixteen notches 172 and sixteen teeth 173 in order to provide sixteen indexing movements in a longitudinal path, one for each of the columns of the microfiche.

When the solenoid SOL–6 is de-energized, the spring 177 will force the latching element 171 into engagement with the next succeeding notch, and the microfiche carriage will be maintained in a fixed position until the particular microimage that is disposed for scanning has been scanned.

While the invention has been described with reference to the structure disclosed herein, it is not confined to the details set forth; and this application is intended to cover such modifications or changes as may come within the purposes of the improvements or the scope of the following claims.

What is claimed is:

1. A device including an escapement mechanism for controlling step-by-step movement of a positionable element, means for supporting the positionable element for movement along a path of movement, an indexing rod mounted on the positionable element and being formed with a series of notches spaced at equal distances along said rod, a latch element movable into and out of said notches for releasably holding said rod and said positionable element in positions determined by said notches, means for activating said latch element for movement into and out of a notch, means for driving said positionable element while said latch element is out of a notch, and means cooperatively associated with said latch element for limiting the driving movement of said positionable element before said latch element is activated into a notch.

2. A device including an escapement mechanism for controlling step-by-step movement of a positionable element, means for supporting the positionable element for movement along a path of movement, an indexing rod mounted on the positionable element and being formed with a first and second series of notches, said notches of each series being spaced at equal distances along said rod, a latch element movable into and out of the notches of each of said series for releasably holding said rod and said positionable element in positions determined by said notches of one of said series, means for alternatingly activating said latch elements for movement into and out of the notches associated therewith, means for driving said positionable element while said one of said latch elements is out of a notch in its respective series, the other latch element and its associated series of notches being adapted to limit the driving movement of said positionable element before said one latch element is activated into one of its notches.

3. A device including an escapement mechanism for controlling step-by-step movement of a positionable element, means for supporting the positionable element for movement along a path of movement, an indexing rod mounted on the positionable element and being formed with a series of notches spaced at equal distances along said rod, a first latching means having a latch element movable into and out of said notches for releasably holding said rod and said positionable element in positions determined by said notches, means for activating said latch element for movement into and out of a notch, means for driving said positionable element while said latch element is out of a notch, and a second latching means for arresting the driving movement of said positionable element before said latch element is activated into a notch.

4. A device including an escapement mechanism for controlling step-by-step movement of a positionable element, means for supporting the positionable element for movement along a path of movement, an indexing rod mounted on the positionable element and being formed with a series of notches spaced at equal distances along said rod, a first latching means having a latch element movable into and out of said notches for releasably holding said rod and said positionable element in positions determined by said notches, means for activating said latch element for movement into and out of a notch, means for driving said positionable element while said latch element is out of a notch, a second latching means engageable with said indexing rod for arresting the driving movement of said positionable element before said latch element is activated into a notch, and means for releasing the engagement of said second latching means with the indexing rod as said latch element is moved into a notch.

5. A device including an escapement mechanism for controlling step-by-step movement of a positionable element, means for supporting the positionable element for movement along a path of movement, an indexing rod mounted on the positionable element and being formed with two series of notches, said notches of each series being spaced at equal distances along said rod, first latching means having a first latch element movable into and out of one of the series of notches for releasably holding said rod and said positionable element in positions determined by said notches, a second latching means having a second latch element movable into and out of the other of said notches for arresting the movement of the positionable element before said first latch element is activated into a notch of said one series, means for alternatingly activating each of said latch elements into and out of its operative engagement with the series of notches associated therewith, and means for driving said positionable element while said first latch element is out of a notch.

6. A device including an escapement mechanism for controlling step-by-step movement of a positionable element, means for supporting the positionable element for movement along a path of movement, an indexing rod mounted on the positionable element and being formed with two series of notches, said notches of each series being spaced at equal distances along said rod, a first latching means having a latch element movable into and out of the notches of one of said series for releasably holding said rod and said positionable element in positions determined by said notches, means for activating said latch element for movement into and out of a notch, means for driving said positionable element while said latch element is out of a notch, and a second latching means having a latch element engageable with the notches of the other series for arresting the driving movement of said positionable element before the latch element of said first latching means is activated into a notch.

7. A device including an escapement mechanism for controlling step-by-step movement of a positionable element, means for supporting the positionable element for movement along a path of movement, an indexing rod mounted on the positionable element and being formed with two series of notches, said notches of each series being spaced at equal distances along said rod, a first latching means having a latch element movable into and out of the notches of one of said series for releasably holding said rod and said positionable element in positions determined by said notches, means for activating said latch element for movement into and out of a notch, means for imparting driving movement to said indexing rod rectilinearly in either of two directions, a second latching means having at latch element engageable with the notches of the other series for arresting the driving movement of said indexing rod during movement thereof in one direction before the latching element of said first latching means is activated into a notch, and means for releasing the engagement of both of said latching means with said indexing rod during the driving movement of said indexing rod in the other direction.

8. A device including an escapement mechanism for controlling step-by-step movement of a positionable element, means for supporting the positionable element for movement along a path of movement, an indexing rod mounted on the positionable element and movable therewith, means for imparting driving movement to said indexing rod rectilinearly in either of two directions, a first latching means engageable with said indexing rod for arresting the same and said positionable element at predetermined positions along said rod, a second latching means engageable with said indexing rod for releasably holding the driving movement of said indexing rod during movement thereof in the other direction before said first latching means is effective to hold said indexing rod in a predetermined position, and means for releasing the engagement of both of said latching means with said indexing rod during the driving movement of said indexing rod in the other direction.

References Cited

UNITED STATES PATENTS 2,573,278 10/1951 Rowe et al. ---------- 95—37

MILTON KAUFMAN, *Primary Examiner.*